G. L. THORNE & G. C. FARNSWORTH.
Heater.
No. 197,748. Patented Dec. 4, 1877.
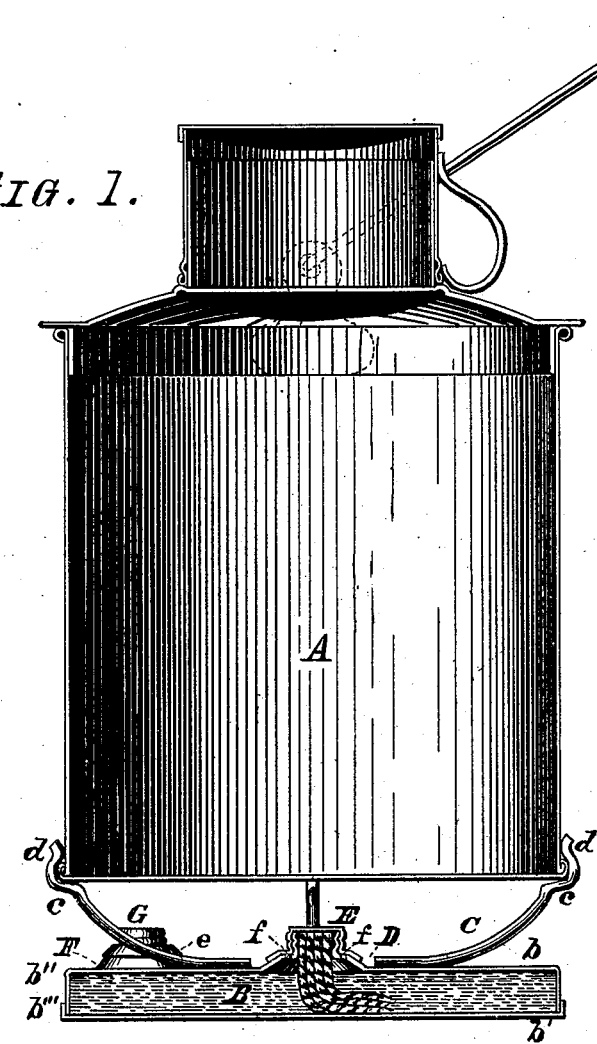
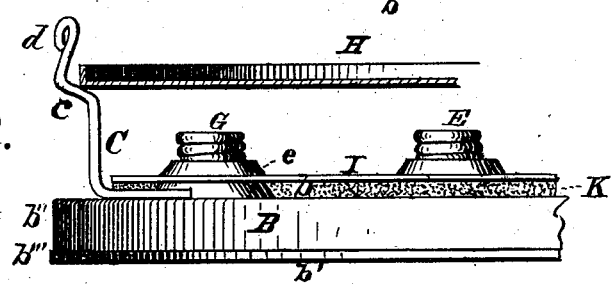
Witnesses:
Frank Hirsch
Chas. Brosart
Inventors:
Geo. L. Thorne,
Geo. C. Farnsworth
by Michael J. Stark
Atty.

UNITED STATES PATENT OFFICE.

GEORGE L. THORNE AND GEORGE C. FARNSWORTH, OF BUFFALO, N. Y.

IMPROVEMENT IN HEATERS.

Specification forming part of Letters Patent No. 197,748, dated December 4, 1877; application filed October 5, 1877.

*To all whom it may concern:*

Be it known that we, GEORGE L. THORNE and GEORGE C. FARNSWORTH, both of Buffalo, Erie county, New York, have jointly invented certain new and useful Improvements on a Heater; and we do hereby declare that the following description of our said invention, taken in connection with the accompanying sheet of drawings, forms a full, clear, and exact specification, which will enable others skilled in the art to which it appertains to make and use the same.

Our present invention relates, generally, to lunch, &c., heaters; and it consists in the combination and arrangement, with a dinner-pail or other culinary vessel, of a heater removably attached to said vessel by means of spring clamps or catches, substantially as hereinafter more fully set forth and described.

In the drawings heretofore mentioned, Figure 1 is a longitudinal sectional elevation of our improved pail and heater. Fig. 2 is a fragmental view of part of the heater, spring-catch, and steak-broiler, &c.

Like letters of reference indicate similar parts in both figures.

A is the usual dinner-pail or similar culinary vessel, made either round or square in any of the well-known manners. To this vessel is removably attached a reservoir, B, by means of a series of catches or clamps, C. This reservoir B has centrally a wick-tube, D, provided externally with a screw-thread for the reception of a screw-cap, E, by means of which said tube D is hermetically sealed when the apparatus is not in use. It is further provided with a filling-tube, F, having the cap G arranged in precisely the same manner as that for the wick-tube. The vessel B is preferably made of two metallic disks, $b$ $b'$, respectively, of which one has a wide rim, $b''$, produced thereon in the process of stamping or otherwise, and the other a similar but narrow edge, $b'''$, fitting over the rim $b''$, the parts being united by soldering the seam. Upon the top disk $b$ is arranged a series of clamps, C, consisting of bent pieces of metal flattened on one extremity, where they are secured to said disk, and provided with offsets $c$ near their upper ends, upon which the bottom of the vessel A rests. The extreme end of these clamps is first bent inwardly, so as to securely grasp the said vessel A above its bottom seam, and then bent slightly outwardly to enable the passage of the vessel A over the clamps. This curved part $d$ serves also as a guard, to prevent the vessel A from being displaced from the supports C in case said vessel is smaller in diameter than the opposite projecting prongs $d$, while said inwardly-curved part, engaging the projecting bottom seam of the vessel A, enables the reservoir B to be carried about with said vessel.

The clamps may be constructed in various manners; but they should be sufficiently elastic, so as to allow them to be sprung apart, and thereby to tightly embrace the vessel A. When thus constructed the reservoir B will be suspended from the vessel A when the latter is being carried about, and may be readily removed therefrom at pleasure. In Fig. 1, we have shown the clamps to extend with their shanks nearly to the center of the vessel B. In this case the length of said clamps is such as to render them sufficiently elastic by deflection; but they may also be made as shown in Fig. 2, where the said clamp is made shorter, and attached near the outer edge of the vessel B. Here the clamp is comparatively rigid, but capable of being bent outwardly on account of the disk $b$ being flexible and capable of deflecting.

Various other methods of flexible fastenings may be employed without departing from our invention.

For broiling steaks, frying, and similar purposes, we employ the pan H, which is placed upon the part $c$ of the spring-clamps C. When not in use for such purposes, it serves as a partition in the vessel A to separate different kinds of food, and thus prevent their being mixed or imparting their peculiar flavors to one another.

In use the reservoir B is filled, preferably with alcohol, and the burner lighted, when the pail is placed upon the spring-catches and its contents quickly heated from the flame and heat produced by the combustion of the fuel.

A heater of the kind described, when used for a long space of time, is apt to conduct heat down into the reservoir B, and there to evaporate the liquid used as fuel. To guard against this drawback, which has thus far rendered every heater more or less troublesome, and in many cases useless, we place between the top disk $b$ and the bottom of the vessel A a metallic disk, I, a suitable distance above said disk $b$. This will leave an air-space above said disk $b$, which effectually prevents the conducting of heat downward, and thus accomplishes the object in view. To still further guard against this conducting of heat, a disk of a non-conducting material or substance, such as felt, woolen cloth, plaster-of-paris, or similar substances, may be interposed between the disks I and $b$.

The fuel used being very volatile, it will be rapidly evaporated at ordinary temperature; and to turn the gases thus generated to useful account, we provide the wick-tube D with one or more perforations, $f$, leading to the interior of the reservoir B, through which the ascending gases pass, and, being ignited by the flame of the burner, are thus consumed.

When the cap E is screwed home after the flame is extinguished, its flaring flange $e$ will meet the flaring part of said wick-tube, and, making a tight joint therewith, prevent the escape of gases by closing said apertures $f$.

If desired, a perforated guard may be placed around the vessel B, to reach up to the vessel A, in which case the entire apparatus can readily be carried about in the open air while the heater is in operation.

It is evident that, the clamps C being elastic, as specified, vessels of different diameters may readily be clamped between them, and that it will not matter whether said vessels are circular or angular in configuration.

Having thus fully described our invention, we claim—

1. The improved lunch, &c., heater herein-before described, consisting, essentially, of a vessel, A, having a projecting bottom seam, and a reservoir, B, provided with a wick-tube, D, closed by a cap, E, said vessel A being removably secured to the reservoir B by means of clamps or supports C, arranged to grasp said vessel A above its projecting bottom seam, which forms a shoulder to prevent the reservoir from dropping, as and for the purpose specified.

2. The herein-described heater, consisting of the flat reservoir B, having centrally a wick-tube, D, provided with a cap, E, and the radial upwardly-projecting supports C, having the offsets $c$ and the projecting guard-pieces $d$, the whole being constructed and arranged to operate substantially as and for the purpose specified.

3. As a new article of manufacture, a heater adapted to be used in conjunction with an ordinary dinner-pail or other vessel, consisting, essentially, of a flat reservoir, B, containing liquid fuel, and provided with a wick-tube, D, and supports C, having the offsets $c$ and upwardly-projecting guards $d$, the whole being constructed and arranged substantially as and for the use and purpose specified.

4. The wick-tube D, having a flaring flange and the perforations $f$, in combination with the cap E, having the corresponding flange $e$, as and for the use and purpose specified.

In testimony that we claim the foregoing as our invention we have hereto set our hands and affixed our seals in the presence of two subscribing witnesses.

GEO. L. THORNE. [L. S.]
GEO. C. FARNSWORTH. [L. S.]

Attest:
MICHAEL J. STARK,
FRANK HIRSCH.